Patented Sept. 7, 1937

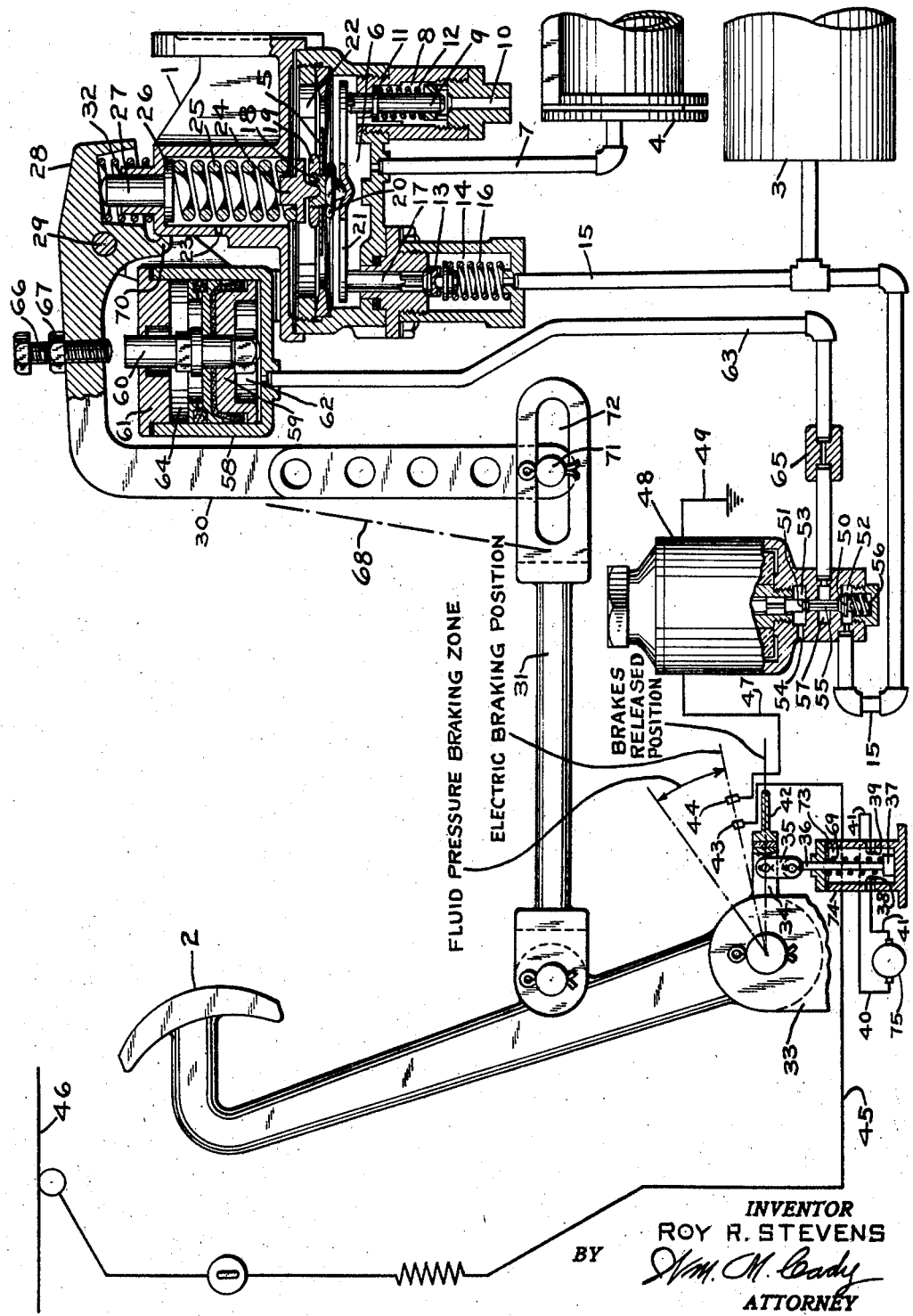

2,092,364

UNITED STATES PATENT OFFICE 2,092,364

BRAKING SYSTEM

Roy R. Stevens, Forest Hills, Pa., assignor to The Westinghouse Air Brake Company, Wilmerding, Pa., a corporation of Pennsylvania Application July 26, 1933, Serial No. 682,243

23 Claims. (Cl. 303—3)

This invention relates to a brake system for vehicles and more particularly to a brake system embodying both electric and fluid pressure operated braking means.

There are various types of electric brake systems such as the regenerative type in which the car motors are employed as generators to effect regenerative braking action, and also the eddycurrent type in which a short circuited rotor, geared or otherwise connected to the running gear of a vehicle, is operated in an excited field to effect braking action. With either of these types of electric brake systems, the electric braking action reduces as the vehicle speed is reduced until, when some predetermined low speed is reached, the electric braking action becomes of little or no value in causing further deceleration. When this low speed is reached by the action of the electric brake, it is then desirable that brakes be applied by some other means to ensure that the car will be brought to a stop.

The principal object of my invention is to provide in connection with an electric brake system, a fluid pressure brake system and means whereby the fluid pressure brake system automatically operates to provide braking power for stopping the vehicle when the effectiveness of the electric brake system becomes reduced to the point at which it is of substantially no value.

The invention is particularly adapted to service in which a vehicle or car, operating on schedule, usually runs between stops at a certain definite speed and in which the rate of deceleration upon making a stop is generally substantially constant.

The invention is carried out by providing means, preferably automatically set in operation upon the initiation of electric braking action, to provide for a predetermined application of brakes by fluid under pressure by the time the effectiveness of the electric brake action is reduced to a degree at which it is substantially ineffective. This predetermined degree of application of brakes by fluid under pressure may be only of sufficient value to ensure stopping of the car from the low speed at which the electric brake becomes substantially ineffective, or, if desired, it may be of any value up to the maximum degree obtainable by operation of the fluid pressure brake system, and may be so arranged as to compensate for the reduction in effectiveness of the electric brake as the car speed reduces.

Other objects and advantages will appear in the following more detailed description of the invention.

In the accompanying drawing, the single figure is a diagrammatic view, mainly in section, of a combined fluid pressure brake system and electric brake system embodying my invention.

The fluid pressure brake system may comprise a brake valve device 1, a foot pedal 2 for controlling the operation of said brake valve device, a main reservoir 3 and a brake cylinder 4.

The brake valve device is of the type known as the self-lapping brake valve and comprises a casing containing a flexible diaphragm 5 having at one side a chamber 6 connected to a pipe 7 leading to the brake cylinder 4, and having at the opposite side a chamber 22 open to the atmosphere through a passage 23. Disposed in a chamber 8, which is at all times open to the brake cylinder chamber 6, is a brake cylinder release valve 9 for controlling communication from chamber 8 to a passage 10 leading to the atmosphere. The release valve 9 is provided with a collar 11, and a spring 12 acting on said collar urges said valve to its unseated or open position. A brake cylinder supply valve 13 is disposed in a chamber 14 which is connected to a pipe 15 leading to the main reservoir 3, and a spring 16 in chamber 14 acts on the supply valve 13 for urging said valve to its seat. The supply valve 13 is provided with a fluted stem 17 slidably extending through a suitable bore in the casing into the brake cylinder chamber 6.

A member 18 extending through the flexible diaphragm 5 at its center is secured thereto preferably by jam nuts 19 and 20. The end of member 18 projecting into the brake cylinder chamber 6 is preferably rounded. An actuating bar 21 carried on the end of the supply valve stem 17 and on the release valve 9 is provided preferably midway between said valves with a cavity in which the rounded end of the member 18 engages.

The end of member 18 projecting into chamber 22 is provided with an indentation adapted to receive the rounded end of a spring follower 24. One end of a brake control spring 25 engages the follower 24 and the other end of said spring engages a plate 26 provided with a stem 27 slidably projecting through a suitable bore in the brake valve casing.

A lever for controlling the operation of the brake valve device 1 is pivotally carried by a pin 29 mounted in the casing, said lever having one arm 28 engaging the end of stem 27 and another arm 30 connected by means of a link 31 to the foot pedal 2. A light bias spring 32 is interposed between the brake valve casing and the end of the lever arm 28.

The foot pedal 2 is pivotally carried by a bracket 33 and is movable to a brakes released position, an electric braking position, and through a fluid pressure braking zone.

The foot pedal 2 is provided with an arm 34 for controlling an electric brake system which may comprise a switch casing 74 disposed adjacent to the arm 34, and arranged in a chamber 73 within said casing is a contact member 37 having a stem 36 which is operatively connected to the arm 34 by a link 35. A spring 69 is interposed between the contact member 37 and the top wall of chamber 73, said spring being suitably insulated from the contact member 37 and adapted to urge said contact member into engagement with the lower wall of said chamber which defines the brake released position of said foot pedal.

The contact member 37 is provided to control an electric brake system which for the purpose of illustration may be of the regenerative type comprising a generator 75, fixed contacts 38 and 39 and wires 40 and 41 connecting said generator to said fixed contacts which are adapted to be connected by the contact member 37 when the foot pedal is moved to the electric braking position. When a circuit is thus closed through the generator 75 by means of the contact member 37, the regenerative braking action takes place.

According to the invention, a contact finger 42 is carried by but insulated from the arm 34 on the foot pedal 2 and is adapted to bridge two stationary contacts 43 and 44 when the foot pedal 2 is in the electric braking position. The contact 43 is connected to a wire 45 leading to a trolley 46 or any other suitable source of electrical energy, while the contact 44 is connected by a wire 47 to a magnet 48 of a magnet device, said magnet having its other terminal connected to ground through a wire 49.

The magnet device comprises in addition to magnet 48 two oppositely seating valves 50 and 51 adapted to be controlled by said magnet. The valve 50 is contained in a chamber 52 connected to pipe 15 leading to the main reservoir 3 and is adapted to supply fluid under pressure from pipe 15 to a chamber 57. The valve 51 is contained in a chamber 53 and is adapted to control communication from chamber 57 to chamber 53 which is open to the atmosphere through a passage 54. The valve 50 is provided with a fluted stem 55 engaging valve 51 whereby one of the valves 50 and 51 is unseated upon seating of the other valve. A spring 56 contained in chamber 52 acts on the valve 50 for urging said valve to its seat and at the same time urging valve 51 from its seat upon deenergization of the magnet 48.

The magnet device just described is provided to control the supply and release of fluid under pressure to an actuating device 58 associated with the brake valve device 1. The actuating device 58 comprises a casing containing a movable piston 59 and a push rod or stem 60 carried by said piston. The stem 60 slidably extends through a suitable bore in a cover 61 in operative alignment with the brake valve operating lever arm 30.

The actuating piston 59 has at one side a chamber 62 connected to a pipe 63 leading to chamber 57 of the magnet device, and has at the opposite side a chamber 64 which is at all times open to the atmosphere through clearance space between stem 60 and the bore in cover 61 through which said stem operates. A choke fitting 65 is interposed in the pipe 63.

An operating pin 66 is carried by the brake valve operating lever arm 30 in working alignment with the piston stem 60, said pin being preferably screw-threaded into said lever arm and being provided with a lock nut 67 for securing said pin in an adjusted position.

The brake valve device, and therefore its operating lever arm 30, is shown in the brakes released position which is defined by engagement of a stop lug 70 on said arm with the brake valve casing. The brake valve lever arm 30 is movable from this brakes released position in a clockwise direction to effect the operation of the brake valve device to apply the brakes with fluid under pressure; the degree of the application of the brakes being varied according to the extent the lever arm 30 is moved, the maximum application being obtained when the lever arm 30 is moved to a position indicated by a dot and dash line 68.

The link 31 is operatively connected to the lever arm 30 through a pin 71 carried by said arm, the end of the link being provided with a slot 72 into which the pin 71 extends. The slot 72 is provided to permit relative movement between the foot pedal 2 and the brake valve operating lever arm 30 for reasons which will be hereinafter described.

In operation, the main reservoir 3 is charged with fluid under pressure in the usual manner and fluid under pressure from said reservoir flows through pipe 15 to the supply valve chamber 14 in the brake valve device 1 and to valve chamber 52 in the magnet device. With the foot pedal 2 in the release position, as indicated in the drawing, the contact finger 42, associated with said pedal, is out of engagement with contacts 43 and 44 so that the magnet 48 is deenergized which permits spring 56 in said magnet device to seat valve 50 and unseat valve 51. With valve 51 unseated, chamber 62 at the lower face of piston 59 in the brake valve device is open to the atmosphere through pipe 63, chamber 57 in the magnet device, past the valve 51 and through atmospheric passage 54, which permits piston 59 to assume, due to gravity, the position indicated in the drawing.

When the foot pedal 2 is in the release position and piston chamber 62 at the lower face of the piston 59 is open to the atmosphere, the parts of the brake valve device assume the release position, as shown in the drawing, in which position the control spring 25 is expanded and the pressure thereof is so reduced as to permit spring 16 to hold the supply valve 13 seated, and spring 12 to hold the release valve 9 unseated. With the release valve unseated, the brake cylinder 4 is open to the atmosphere through pipe 7, chamber 6 in the brake valve device, past the unseated release valve 9 and through the atmospheric passage 10.

If it is desired to decelerate a vehicle by means of the regenerative brake means, the foot pedal 2 is turned in a counter-clockwise direction to the electric braking position, in which the switch contact 37 connects the contacts 38 and 39, thereby closing the circuit through the generator 75 which then operates to cause deceleration of the vehicle.

Upon movement of the pedal to the electric braking position, the contact finger 42 carried by said pedal bridges the contacts 43 and 44, thereby closing the circuit for supplying electric current from supply wire 45 to wire 47 leading to the magnet 48. The magnet 48 is thereupon energized and operates to seat valve 51 and unseat valve 50.

With valve 50 unseated, fluid under pressure supplied from main reservoir 3 through pipe 15 to valve chamber 52 flows past valve 50 to chamber 57 and from thence through pipe 63 and the choke fitting 65 in said pipe to chamber 62 below piston 59 in the brake valve device. The piston 59 is thereby moved upwardly relative to the lever arm 30 until the stem 60 engages the operating pin 66, after which further movement of piston 59 turns the lever arm 30 in a clockwise direction about the fulcrum pin 29, the movement of piston 59 being limited by engagement with the cover 61.

The turning of the lever arm 30 in a clockwise direction acts through arm 28, stem 27 and plate 26 to move the upper end of the brake control spring 25 downwardly. The pressure of spring 25 on the diaphragm 5 and actuating bar 21 is thereby increased to a degree which first overcomes the pressure of spring 12 acting on the release valve 9 and moves said valve to its seat, after which further increase in the pressure of spring 25 applied to the actuating bar 21 rocks said bar on the end of the release valve 9 and moves the supply valve 13 away from its seat.

Upon unseating the supply valve 13 fluid under pressure, supplied from the main reservoir 3 through pipe 15 to valve chamber 14, flows past the valve 13 to chamber 6 and from thence through pipe 7 to brake cylinder 4, thereby applying the brakes with fluid under pressure in the usual manner. When the pressure obtained in the brake cylinder and in chamber 6 acting on the lower face of diaphragm 5 becomes slightly greater than the opposing pressure of the control spring 25, said diaphragm is deflected upwardly, thereby relieving the unseating pressure on valve 13 which permits spring 16 to seat said valve so as to prevent further flow of fluid under pressure to the brake cylinder.

It will be evident that since the magnet 48 is energized upon moving the foot pedal 2 into the electric braking position, fluid under pressure immediately starts to flow to piston chamber 62 in the brake valve device to cause operation of the brake valve device to apply the brakes with fluid under pressure so as to stop the car after the effectiveness of the regenerative brake is reduced to a negligible degree.

The degree of the application of brakes with fluid under pressure is governed by the amount of movement of the brake valve operating lever arm 30 by the piston stem 60. As shown in the drawing, there is considerable space between the end of the stem 60 and the operating pin 66, and since the movement of the piston 59 and stem 60 is fixed, the actual movement of the brake valve operating arm 30 is equal to the full movement of piston 59 and stem 60 less the clearance space between said stem and the operating pin 66 and this is adapted to produce less than a full application of the fluid pressure brakes. If the pin 66 is adjusted to just engage stem 60 with lever 30 in its release position, then the operation of piston 59 is adapted to move the brake valve operating lever arm 30 and thereby the brake valve through the full operating range, but if the pin 66 is turned so that when the piston 59 is moved out, the stem 60 will not engage the pin 66 so as to actuate the lever 30, then the brake valve device will not be operated to supply fluid under pressure to the brake cylinder.

It will therefore be evident that by adjusting the pin 66, the maximum braking force obtained by operation of the brake valve device by means of piston 59 may be limited as desired.

The rate at which the brakes are applied by operation of the brake valve device while the regenerative brake is acting is controlled by the capacity of choke fitting 65 to supply fluid under pressure to piston chamber 62. This rate of supply may be such as to cause such gradual operation of the lever arm 30, and consequent compressing of the brake control spring 25 and gradual opening of the supply valve 13 as to obtain just sufficient pressure in the brake cylinder 4 to stop the vehicle at the time the car speed has become so reduced that the regenerative brake has become substantially ineffective, or if desired, the choke fitting 65 may be of such size as to apply the brakes with fluid under pressure at a more rapid rate, such for instance, that the effectiveness of the fluid pressure brakes may increase as the effectiveness of the regenerative brake reduces upon a reduction in the speed of the vehicle.

The slot 72 in one end of link 31 is of such length as to permit the foot pedal 2 to move to the electric braking position without engaging pin 71 on the lever arm 30, and with said foot pedal in the electric braking position, the slot 72 is adapted to permit such relative movement of the arm 30 as may be produced by the operation of the piston 59. In case the regenerative brake fails to act however, or if it is desired to operate the brake valve device to obtain a greater application of the fluid pressure brakes than obtained by operation of the piston 59, the foot pedal is moved into the fluid pressure braking zone. Upon entering this zone the link 31 is adapted to engage the pin 71 so as to immediately effect operation of the brake valve device to apply the brakes in case the brake valve device has not previously been operated by the piston 59. In the latter case the link 31 is moved until it picks up lever arm 30 by engagement with pin 71 after which further movement of said link by the foot pedal 2 is adapted to increase the degree of application over that obtained from operation of the piston 59. It will be evident that regardless of the adjustment of pin 66 or of the operation of the regenerative braking means or of magnet 48, movement of the foot pedal 2 into the fluid pressure braking zone may be effected whenever desired to obtain an application of the brakes by fluid under pressure.

In the fluid pressure braking zone the contact finger 42 is moved out of engagement with the contacts 43 and 44 so that the circuit through magnet 48 is opened. Magnet 48 is thus deenergized and acts to vent fluid under pressure from piston chamber 62 in the brake valve device which relieves the pressure of said piston on the lever arm 30 so as not to interfere with the control of the brake valve device by the pedal 2 in the fluid pressure braking zone.

To effect a release of the brakes, foot pressure is removed from the foot pedal 2 which permits spring 69 acting on the contact member 37 to return the foot pedal to the brakes released position.

In the brakes released position of foot pedal 2, the magnet 48 is deenergized which opens piston chamber 62 to the atmosphere so that the pressure of said piston on the lever arm 30 is relieved, if not previously relieved in the fluid pressure braking zone, as above described. With the brake applying force thus removed from the lever arm 30 and consequently from the brake control spring 25, said spring expands and reduces the pressure on the flexible diaphragm 5, whereupon, brake cylinder pressure in chamber 6 deflects said diaphragm upwardly, thus removing pressure from the actuating bar 21. Spring 12 acting on the release valve 9 then unseats said valve which permits fluid under pressure to be vented from the brake cylinder 4 through pipe 7, chamber 6, past the release valve 9 and from thence to the atmosphere through the atmospheric passage 10.

With an electric brake of the type such as a regenerative brake or eddy-current brake in which the braking force reduces as the speed of the vehicle is reduced, it will be noted that with my invention the rate of increase in braking force effected by operation of the brake valve device 1 is so proportioned or regulated, that by the time the speed of the vehicle is reduced to such an extent that the electric brake is practically ineffective, the braking force produced by operation of the brake valve device will have been increased to a degree necessary to provide adequate braking force.

The above action is due to the fact that when the magnet 48 is energized, the flow of fluid to the piston chamber 62 is at a slow rate as determined by the capacity of the choke fitting 65, so that there is a time interval due to the slow movement of the piston 59. In addition, due to the relative movement of the stem 60 by the piston 59, the lever arm 30 is not moved until the stem 60 has taken up the lost motion.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle braking system, the combination with an electric braking apparatus and a fluid pressure braking apparatus, of means operative to cut the electric braking apparatus into action, means operative upon cutting the electric braking apparatus into action for effecting operation of the fluid pressure braking apparatus to provide a uniform application of fluid pressure brakes regardless of the operation of the electric braking apparatus, means operative automatically for limiting the degree of said uniform application of brakes to less than a full application, and means for controlling the operation of the first two mentioned means.

2. In a vehicle braking system, the combination with an electric braking apparatus and a fluid pressure braking apparatus, of means operative to cut the electric braking apparatus into action for decelerating a vehicle, means, operative independently of the electric braking apparatus, for effecting the operation of the fluid pressure braking apparatus to provide a uniform application of the fluid pressure brakes by the time the speed of the vehicle is reduced to a predetermined degree, means automatically operative for limiting the degree of said uniform application of brakes to less than a full application, and a member operative upon movement to a predetermined position for effecting the operation of both of said means.

3. In a vehicle braking system, the combination with electric braking means, and switch means operative to cut said electric braking means into action, of a brake cylinder, valve means operative to supply fluid under pressure to said brake cylinder, means for controlling the rate at which fluid under pressure is supplied to said brake cylinder, means for controlling the operation of said valve means to limit the degree of pressure obtained in said brake cylinder to less than a full application, electro-responsive means operative independently of said electric braking means to control the operation of said valve means, and manually controlled means for simultaneously effecting the operation of said switch means and said electro-responsive means.

4. In a vehicle braking system, the combination with a brake cylinder, of a brake valve device for controlling the supply and release of fluid under pressure to and from said brake cylinder, a lever for controlling the operation of said brake valve device to vary the pressure in said brake cylinder according to the position of said lever, a piston operated by fluid under pressure for moving said lever to effect the supply of fluid under pressure to said brake cylinder, means for varying the extent of movement of said lever effected by said piston, electro-responsive means for supplying fluid under pressure for operating said piston, and means for controlling the rate at which fluid under pressure is supplied to said piston upon operation of said electro-responsive means.

5. In a vehicle braking system, the combination with a brake cylinder, of a brake valve device for controlling the supply and release of fluid under pressure to and from said brake cylinder, a lever for controlling the operation of said brake valve device to vary the pressure in said brake cylinder according to the position of said lever, a piston operated by fluid under pressure for moving said lever to effect the supply of fluid under pressure to said brake cylinder, means for varying the extent of movement of said lever effected by said piston, electro-responsive means operative to supply fluid under pressure for operating said piston, electric braking means operative to brake said vehicle, a switch operative to close a circuit for cutting said electric braking means into action, and manually operated means for controlling the operation of said electro-responsive means and switch.

6. In a vehicle braking system, the combination with an electric braking means and a fluid pressure braking means, of a manually operated lever movable to an electric braking position for causing said electric braking means to act and movable to another position for causing only said fluid pressure braking means to act, and means operative upon movement of said lever to the electric braking position to cause said fluid pressure braking means to act independently of the action of the electric braking means.

7. In a vehicle braking system, the combination with an electric braking means and a fluid pressure braking means, of a manually operated lever having an electric braking position and a fluid pressure braking position, of means operative by said lever in the fluid pressure braking position for effecting a full application of the fluid pressure brakes, means operated by said lever in the electric braking position to close a circuit for causing said electric braking means to act, and other means operated by said lever in the electric braking position for causing said fluid pressure braking means to act to effect only a limited application of the fluid pressure brakes.

8. In a vehicle braking system, the combination with an electric braking means and a fluid pressure braking means, of a manually operated lever having an electric braking position and a fluid pressure braking position, of means operated by said lever in the electric braking position to close a circuit for causing said electric braking means to act, other means operated by said lever in the electric braking position for causing said fluid pressure braking means to act, adjusting means for regulating the degree of the application of brakes effected by the operation of said other means, restricting means for regulating the rate of said application of brakes, and means for effecting the operation of said fluid pressure braking means to apply the brakes to a degree and at a rate independent of said adjusting means and restricting means upon movement of said lever to the fluid pressure braking position.

9. In a vehicle brake system, the combination with a brake cylinder, of a brake valve device for supplying and releasing fluid under pressure to and from said brake cylinder, a lever for controlling the operation of said brake valve device to vary the pressure in said brake cylinder according to the position of said lever, a piston operated by fluid under pressure for moving said lever to effect the supply of fluid under pressure to the brake cylinder, means for adjusting the degree of movement of said lever by said piston, means for supplying fluid under pressure to said piston, electric braking apparatus, means for cutting said electric braking apparatus into action, a manually operated means having an electric braking position for effecting the operation of the two last mentioned means, said manually operated means having a fluid pressure braking position, and a link connecting said lever to said manually operated means for controlling the operation of said brake valve device independently of said piston and the adjusting means upon movement of said manually operated means to said fluid pressure braking position, said link having a lost motion connection to said lever effective in the electric braking position to permit movement of said lever independently of said manually operated means.

10. In a vehicle braking system, the combination with electric braking means operative to apply braking force to said vehicle in accordance with the speed thereof, of fluid pressure braking means operative to apply braking force to said vehicle, means for initiating the operation of the electric braking means, means set in operation upon initiating the operation of said electric braking means for operating the fluid pressure braking means, and means for regulating the operation of the fluid pressure braking means to provide a chosen partial degree of application of the fluid pressure brakes a predetermined time after initiating the operation of the electric braking means.

11. In a vehicle braking system, the combination with a brake valve device operative either manually or automatically to control the application and release of fluid pressure brakes on said vehicle, of means for controlling the operation of said brake valve device and operative by fluid under pressure to effect the automatic operation of said brake valve device to apply the brakes, electric braking apparatus, a manually operable member having one position for effecting the operation of said means and of said electric braking apparatus, and means for regulating the degree and rate of application of brakes effected by the operation of said brake valve device so as to delay obtaining a predetermined application of the fluid pressure brakes for a predetermined time after the movement of said manually operable member to said position, said manually operated member having another position for effecting the manual operation of said brake valve device.

12. In a vehicle braking system, the combination with a brake valve device operative either manually or automatically to effect an application of fluid pressure brakes on said vehicle, of a movable abutment operated by fluid under pressure for effecting the automatic operation of said brake valve device, electric braking apparatus operative to apply retarding force to said vehicle, a member movable manually to a position for initiating the operation of said electric braking apparatus, and means operable upon movement of said member to said position for supplying fluid under pressure for effecting operation of said abutment, said movable member being operative upon movement out of said position to cut the electric braking apparatus out of action and to operate said brake valve device independently of said means.

13. In a vehicle braking system, the combination with a brake valve device operative either manually or automatically to effect an application of fluid pressure brakes on said vehicle, of means for effecting the automatic operation of said brake valve device to provide a slow increase in braking force, electric braking apparatus operative to apply retarding force to said vehicle, and a member movable to one position for initiating the independent operation of said means and of said electric braking apparatus and movable to another position for manually operating said brake valve device.

14. In a vehicle braking system, the combination with a brake valve device operative either manually or automatically to effect an application of fluid pressure brakes on said vehicle, slow acting means for effecting the automatic operation of said brake valve device to provide a predetermined braking force at the end of a predetermined period of time, electric braking apparatus operative to apply retarding force to said vehicle, and a member movable to one position for concurrently initiating the operation of said slow acting means and said electric braking apparatus and movable to another position for manually operating said brake valve device.

15. In a vehicle braking system, the combination with an electric braking means and a fluid pressure braking means, of a manually operated lever movable to an electric braking position for causing said electric braking means to act and movable to another position for causing only said fluid pressure braking means to act, and means operative upon movement of said lever to the electric braking position to cause said fluid pressure braking means to act.

16. In a vehicle braking system, the combination with an electric braking means and a fluid pressure braking means, of a manually operated lever movable to an electric braking position for causing both said electric braking means and said fluid pressure braking means to act, and movable to another position for causing only said fluid pressure braking means to act, and means operative in the electric braking position to limit the degree of the application of fluid pressure brakes to less than the full degree.

17. In a vehicle braking system, the combination with an electric braking means and a fluid pressure braking means, of a manually operated lever movable to an electric braking position for causing said electric braking means to act and movable to another position for causing only said fluid pressure braking means to act to apply the fluid pressure brakes at a certain rate, means operative upon movement of said lever to the electric braking position to cause said fluid pressure braking means to act, and means operative in the electric braking position to limit the rate at which the fluid pressure braking means become effective to a degree slower than said certain rate.

18. In a vehicle braking system, the combination with an electric braking means and a fluid pressure braking means, of a manually operated lever movable to an electric braking position for causing said electric braking means to act and movable to another position for causing only said fluid pressure braking means to act to apply the fluid pressure brakes at a certain rate, means operative upon movement of said lever to the electric braking position to cause said fluid pressure braking means to act, means operative in the electric braking position to limit the degree of application of fluid pressure brakes to less than a full degree, and other means operative in said electric braking position to limit the rate of application of fluid pressure brakes to a degree less than said certain rate.

19. In a fluid pressure brake, the combination with a self-lapping brake valve device operative to effect an application of the brakes on a vehicle, of a movable member for effecting the operation of said brake valve device, a manually operated lever, link-like means operatively connecting said lever to said movable member for effecting the operation of said brake valve device upon movement of said lever beyond a certain position, said link-like means having a lost motion connection with said movable member through the medium of which said lever is movable relative to said movable member, and means operative by said lever upon such relative movement for also effecting the operation of said brake valve device.

20. In a vehicle brake system, the combination with an electric brake apparatus and a fluid pressure brake apparatus, of a lever having a release position and movable from said release position to an electric braking position for effecting operation of said electric brake apparatus to apply retarding force to said vehicle, said lever being movable from said electric braking position to a fluid pressure braking zone for rendering said electric brake apparatus ineffective and for effecting operation of the fluid pressure brake apparatus to apply the fluid pressure brakes with a degree of force dependent upon the position of said lever in said zone, and means operative in the electric braking position for effecting the operation of the fluid pressure braking apparatus to apply the fluid pressure brakes.

21. In a fluid pressure brake, in combination, a self-lapping brake valve device operative to effect an application of the brakes, a movable member for effecting the operation of said brake valve device, a manually operable member, means operative upon movement of said manually operable member for effecting the operation of said movable member, and mechanism operative upon further movement of said manually operable member for also effecting the operation of said movable member and thereby said brake valve device.

22. In a fluid pressure brake, in combination, a self-lapping brake valve device operative to effect an application of the brakes, a movable member for effecting the operation of said brake valve device, a manually operable member, means operative upon movement of said manually operable member for effecting the operation of said movable member, mechanism operative upon further movement of said manually operable member for also effecting the operation of said movable member and thereby said brake valve device, and an adjustable device for limiting the extent of movement of said movable member which can be effected by said means.

23. In a fluid pressure brake, in combination, a self-lapping brake valve device, a movable member for operating said brake valve device, the degree of application of brakes as effected by said brake valve device being dependent upon the extent of movement of said member, means operative upon movement relative to said member for operating said member, and an adjustable device for limiting the extent of said relative movement.

ROY R. STEVENS.